US009277354B2

(12) United States Patent
Gatewood et al.

(10) Patent No.: US 9,277,354 B2
(45) Date of Patent: Mar. 1, 2016

(54) SYSTEMS, METHODS, AND SOFTWARE FOR RECEIVING COMMANDS WITHIN A MOBILE COMMUNICATIONS APPLICATION

(71) Applicant: Sprint Communications Company L.P., Overland Park, KS (US)

(72) Inventors: John Gatewood, Lee's Summit, MO (US); Kenneth Wayne Samson, Belton, MO (US); Bhanu Prakash Voruganti, Overland Park, KS (US); Matthew P. Hund, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/067,401

(22) Filed: Oct. 30, 2013

(65) Prior Publication Data

US 2015/0119012 A1  Apr. 30, 2015

(51) Int. Cl.
*H04W 4/02* (2009.01)
*G06F 3/0488* (2013.01)
*H04M 1/725* (2006.01)

(52) U.S. Cl.
CPC .............. *H04W 4/02* (2013.01); *G06F 3/04883* (2013.01); *H04M 1/72552* (2013.01); *H04M 1/72522* (2013.01); *H04M 2250/70* (2013.01)

(58) Field of Classification Search
None
See application file for complete search history.

(56) References Cited

U.S. PATENT DOCUMENTS

| 6,677,976 | B2  |   | 1/2004  | Parker et al. |
|-----------|-----|---|---------|---------------|
| 6,937,977 | B2  | * | 8/2005  | Gerson ......................... 704/201 |
| 7,352,854 | B1  | * | 4/2008  | Silver ....................... 379/207.16 |
| 8,224,299 | B2  | * | 7/2012  | Kim et al. ................. 455/414.1 |
| 8,355,349 | B2  |   | 1/2013  | Burg |
| 2001/0044326 | A1 |  | 11/2001 | Shibuya |
| 2002/0085698 | A1 | * | 7/2002 | Liebenow ................ 379/207.13 |
| 2002/0098865 | A1 | * | 7/2002 | Jang et al. ..................... 455/557 |
| 2004/0171375 | A1 |  | 9/2004 | Chow-Toun |
| 2004/0204072 | A1 | * | 10/2004 | Han et al. ..................... 455/557 |
| 2005/0132116 | A1 | * | 6/2005 | Gillet ............................ 710/307 |
| 2007/0254690 | A1 | * | 11/2007 | Griffin et al. .............. 455/550.1 |
| 2012/0127080 | A1 |  | 5/2012  | Kushler et al. |

FOREIGN PATENT DOCUMENTS

EP          2688272        1/2014
WO       2012155469      11/2012

* cited by examiner

*Primary Examiner* — Ashish K Thomas

(57) ABSTRACT

In an embodiment, a method provides for receiving commands within a mobile communications application running on a mobile communication device. The method includes monitoring text entered into a text input region of a touchscreen keyboard module within a user interface on the mobile communication device for an interrupt code, and detecting an interrupt code. The method also includes determining a command from a plurality of commands, based on user inputs following the interrupt code, identifying an action from a plurality of actions corresponding to the plurality of commands, and initiating the action corresponding to the command.

21 Claims, 5 Drawing Sheets

SYSTEMS, METHODS, AND SOFTWARE FOR RECEIVING COMMANDS WITHIN A MOBILE COMMUNICATIONS APPLICATION

TECHNICAL BACKGROUND

Mobile communication devices allow users to communicate with each other using a wide variety of different communication modes, such as email, text, speech, video, or the like. Typically a user has at least one mobile communication application for each of these different communication modes.

When a user wishes to switch communication modes or applications, typically the user must first exit whatever application they are currently using, find the icon or command for the application providing their desired communication mode, and execute that application.

Overview

Embodiments disclosed herein provide systems and methods for receiving commands within a mobile communications application running on a mobile communication device. In an embodiment, a method provides for receiving commands within a mobile communications application running on a mobile communication device. The method includes monitoring text entered into a text input region of a touchscreen keyboard module within a user interface on the mobile communication device for an interrupt code, and detecting an interrupt code. The method also includes determining a command from a plurality of commands, based on user inputs following the interrupt code, identifying an action from a plurality of actions corresponding to the plurality of commands, and initiating the action corresponding to the command.

In another embodiment, one or more non-transitory computer readable storage media having program instructions stored thereon for receiving commands within a mobile communications application running on a mobile communication device is provided. When executed by a computing system, the program instructions direct the computing system to at least monitor text entered into a text input region of a touchscreen keyboard module within a user interface on the mobile communication device for an interrupt code, and to detect an interrupt code.

The program instructions also direct the computing system to determine a command from a plurality of commands, based on user inputs following the interrupt code, to identify an action from a plurality of actions corresponding to the plurality of commands, and to initiate the action corresponding to the command.

In another embodiment a mobile communication device configured for receiving commands within a mobile communications application is provided. The device includes a memory configured to store an action database comprising a plurality of commands and a plurality of actions corresponding to the plurality of commands, and a processor coupled with the memory. The processor is configured to monitor text entered into a text input region of a touchscreen keyboard module within a user interface on the mobile communication device for an interrupt code, and to detect an interrupt code.

The processor is also configured to determine a command from the plurality of commands corresponding to the one or more interrupt codes stored within the interrupt code database, based on user inputs following the interrupt code, to identify an action from the plurality of actions corresponding to the plurality of commands stored within the action database, and to initiate the action corresponding to the command.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
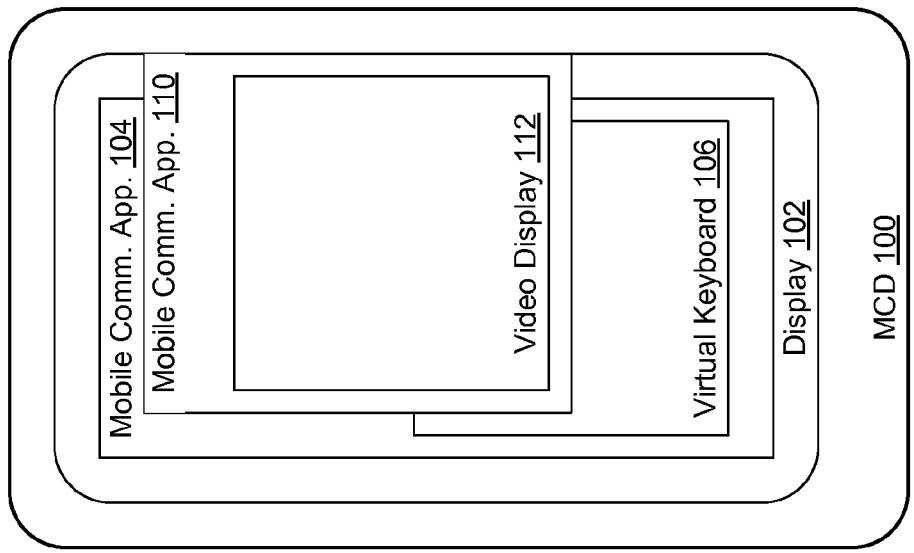
FIG. 1 illustrates a mobile communication device configured to receive commands within a mobile communications application.
Figure 1:
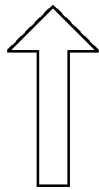
Figure 1:
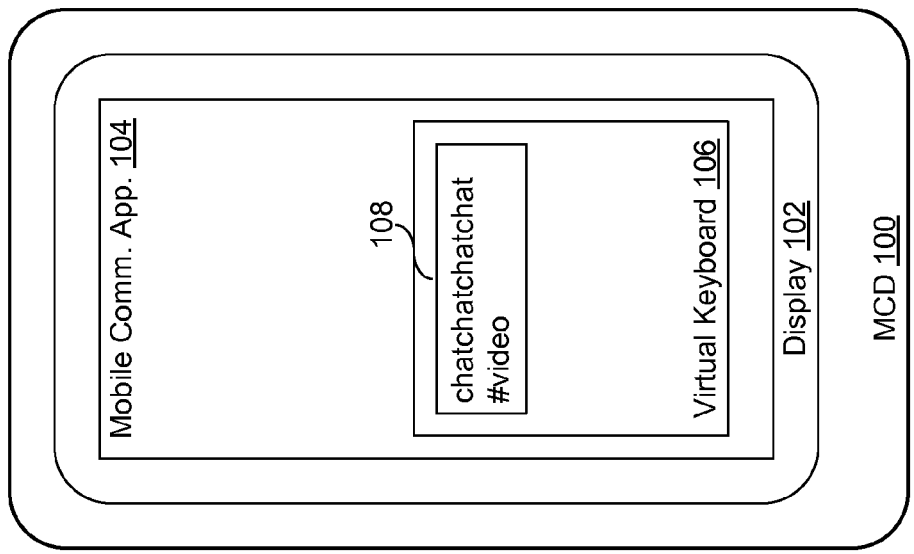

Referring to FIG. 1, mobile communication device 100 includes display 102. Display 102 may be a touchscreen device in some embodiments. Illustrated on display 102 is mobile communication application 104. Mobile communication application 104 includes a virtual keyboard 106 configured to receive touches from a user and to input text into text input area 108.

When a user enters an interrupt code into text input area 108 through virtual keyboard 106, mobile communication device 100 detects the interrupt code and monitors virtual keyboard 106 for the entry of a command by the user. Upon receiving the command from the user, mobile communication device 100 determines an action corresponding to the command, and performs the action.

In this example, the action includes executing mobile communication application 110, and presenting its output on display 102. In this example, mobile communication application 104 was a text messaging application such as a chat or instant messaging application. During a chat session, the user decided that it would be advantageous to have a video chat session.

Normally, the user would need to leave mobile communication application 104, find an icon or command for the video chat application, and execute the video chat application. However, in this example, mobile communication device 100 is configured to receive commands from the user within mobile communication application 104. This enables the user to quickly switch from the textual chat session to a video chat session without needing to leave the textual chat session (mobile communication application 104). The user enters an interrupt code, such as "#", into text input area 108 through virtual keyboard 106. This alerts mobile communication device 100 to expect a command to follow the interrupt code.

Mobile communication device 100 then monitors virtual keyboard 106 for a user-entered command. In this example, the user typed the command "video" after the interrupt code. Mobile communication device 100 determines that an action of executing mobile communication application 110 corresponds to the command "video". Mobile communication device 100 then executes mobile communication application 110 and presents its output on display 102. In this example, mobile communication application 110 is a video chat application and includes video display 110.

In some embodiments, a user may also enter a parameter after the command, such as a user name. In the example above, had the user entered "# video Fred" mobile communication device 100 would have executed the video chat session with Fred. When no parameter is present, the action will be performed with respect to the other user in the initial application. For example, while text chatting with Barney, a user enters "# video" and mobile communication device 100 assumes that since no parameter was entered, that the user wishes to establish a video chat session with Barney.

Figure 2:
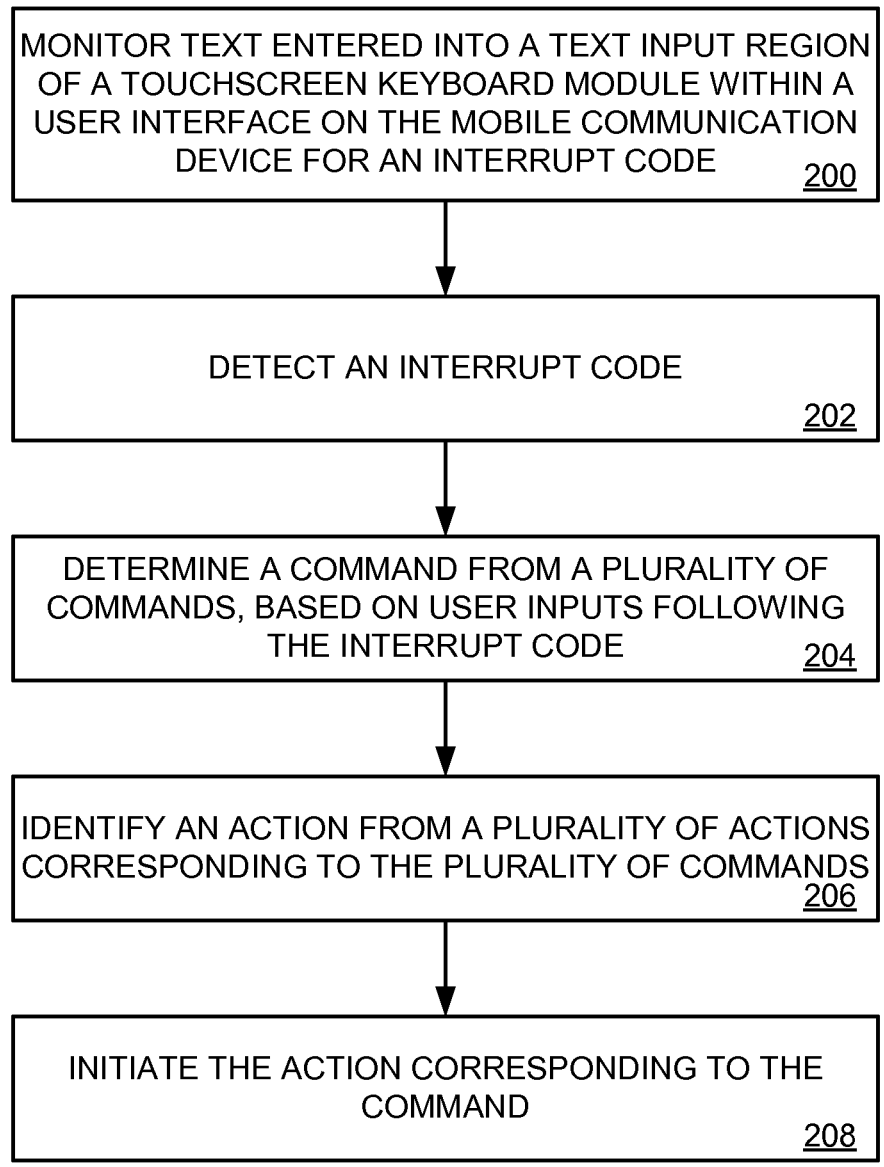
FIG. 2 illustrates a flow chart of a method of operating a mobile communication device configured to receive commands within a mobile communications application.

FIG. 2 illustrates a flow chart of a method of operating a mobile communication device 100 configured to receive commands within a mobile communications application 104. In this example, mobile communication device 100 monitors text entered into text input area 108 of touch screen keyboard module 106 within a user interface on mobile communication device 100 for an interrupt code, (operation 200).

When mobile communication device 100 detects an interrupt code, (operation 202), it determines a command from a plurality of commands, based on user inputs following the interrupt code, (operation 204). For example "#" may be an interrupt command, and in response to detecting the entry of "#" by the user, device 100 monitors text input area 108 of virtual keyboard 106 for a following command. In this example, when the user proceeds to type "video" into text input area 108, device 100 determines that "video" is the desired command.

Mobile communication device 100 identifies an action from a plurality of actions corresponding to the plurality of commands, (operation 206). In this example, device 100 may consult an action database stored in memory. The action database includes a list of commands and a corresponding list of actions corresponding to each of the plurality of commands. In this example, the action of "execute video chat application" may correspond to the "video" command, and mobile communication device executes the video chat application, (operation 208).

Figure 3:
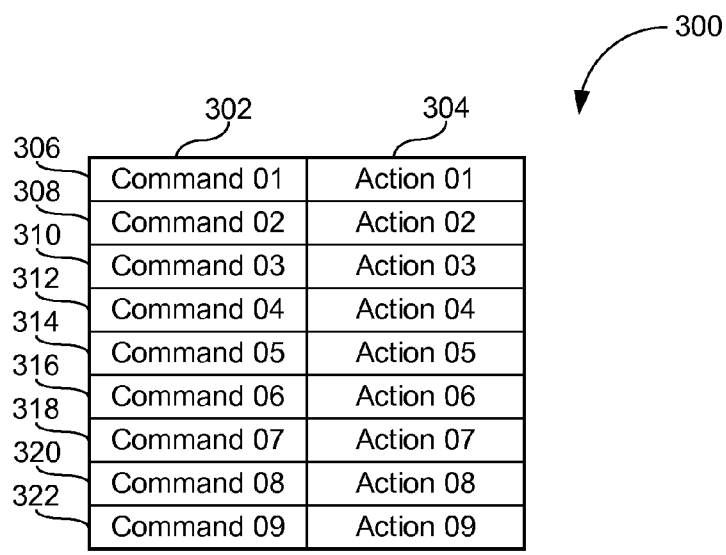
FIG. 3 illustrates a sample action database for use with a mobile communication device configured to receive commands within a mobile communications application.

FIG. 3 illustrates a sample action database 300 for use with a mobile communication device 100 configured to receive commands within a mobile communications application 104. In this example, action database 300 includes nine commands and nine corresponding actions. Here, column 302 contains the nine commands while column 304 contains the nine actions. Row 306 associates action 01 with command 01, row 308 associates action 02 with command 02, row 310 associates action 03 with command 03, and so forth through rows 312-322.

In an example embodiment, a customize screen within the user interface on the mobile communication device 100 is configured to allow a user to associate an action with a command, and the resulting action database 300 is stored in a memory within mobile communication device 100.

The possible actions to be performed based on a command and one or more parameter are unlimited. Some examples include: starting a drawing session in response to "#draw", starting a sharing session in response to "#share", adding users in response to "#add user", starting a video conference in response to "#video user" or "#video all", calling a user in response to "#call user", determining the status of a user in response to "#status user", starting an SMS session with a user in response to "#sms user", dropping a user in response to "#drop user", and emailing a user in response to "#email user." Other possible actions include transferring one or more contacts to another user, providing another user with WiFi information, sharing a location with a user, changing a mode of communication, and the like.

Figure 4:
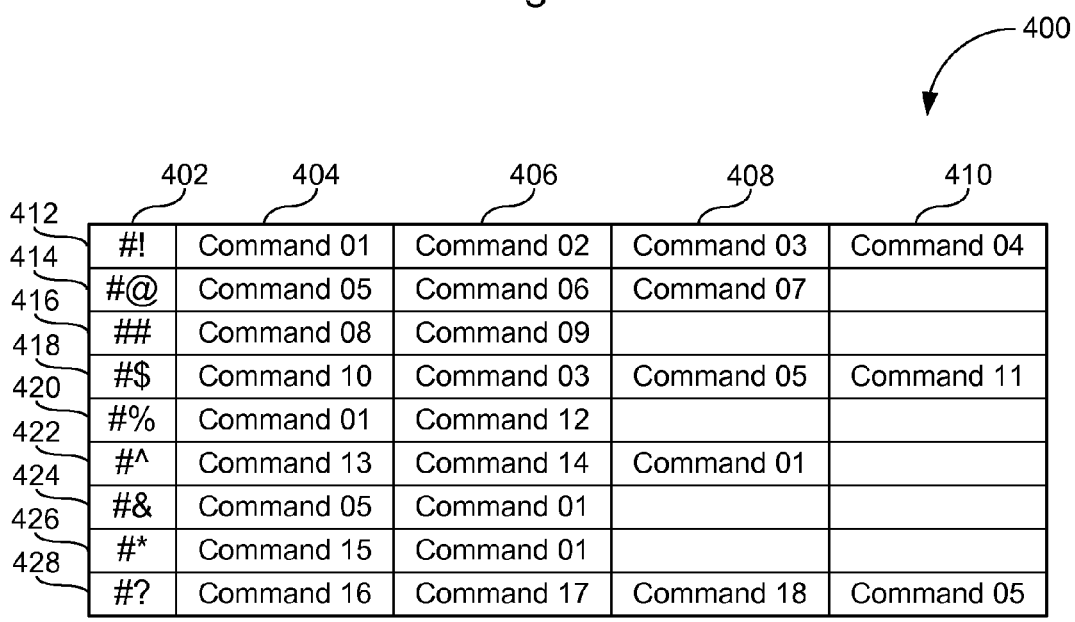
FIG. 4 illustrates a sample interrupt database for use with a mobile communication device configured to receive commands within a mobile communications application.

FIG. 4 illustrates a sample interrupt database 400 for use with a mobile communication device 100 configured to receive commands within a mobile communications application 104. In some embodiments, it may be desirable to allow for a plurality of different interrupt codes. In such an embodiment, interrupt database 400 may be used to associate each interrupt code with a set of allowable commands. This allows users the ability to form groups of commands that are accessible via different interrupt codes.

In this example, interrupt database 400 includes a plurality of interrupt codes in column 402, and a plurality of commands in columns 404-410. For example, in row 412 interrupt code "#!" is associated with commands 01, 02, 03, and 04, in row 414 interrupt code "#@" is associated with commands 05, 06, and 06, in row 416 interrupt code "##" is associated with commands 08 and 09, and rows 418-428 further associate various interrupt codes with various commands.

Figure 5:
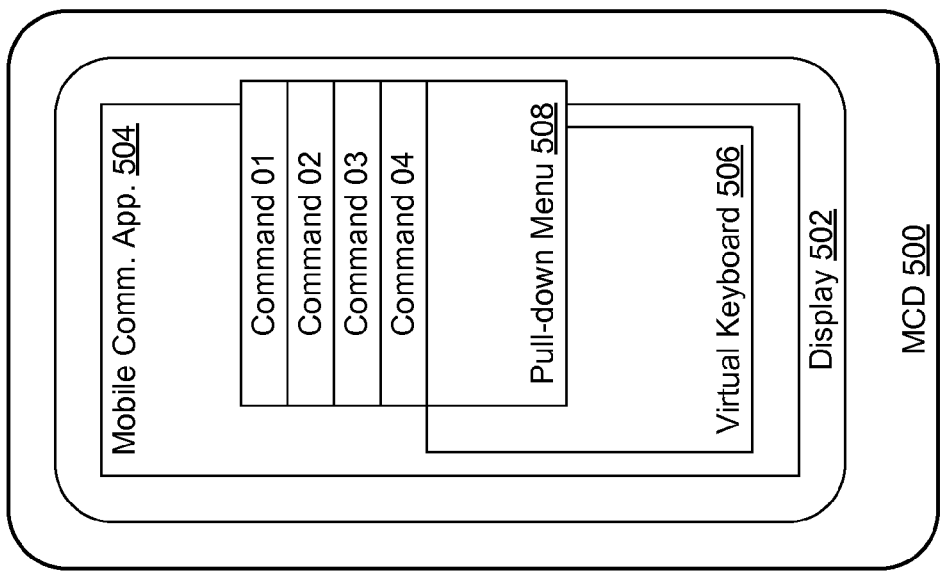
FIG. 5 illustrates a mobile communication device configured to receive commands within a mobile communications application using a pull-down menu.

FIG. 5 illustrates a mobile communication device 500 configured to receive commands within a mobile communications application 504 using pull-down menu 508. In this example, a user has entered an interrupt code while using mobile communication application 504. In response to detecting this interrupt code, mobile communication device 500 has provided the user with pull-down menu 508, allowing the user to select any of the commands associated with the interrupt code entered by the user. In this example, commands 01-04 are available for selection by the user.

Figure 6:
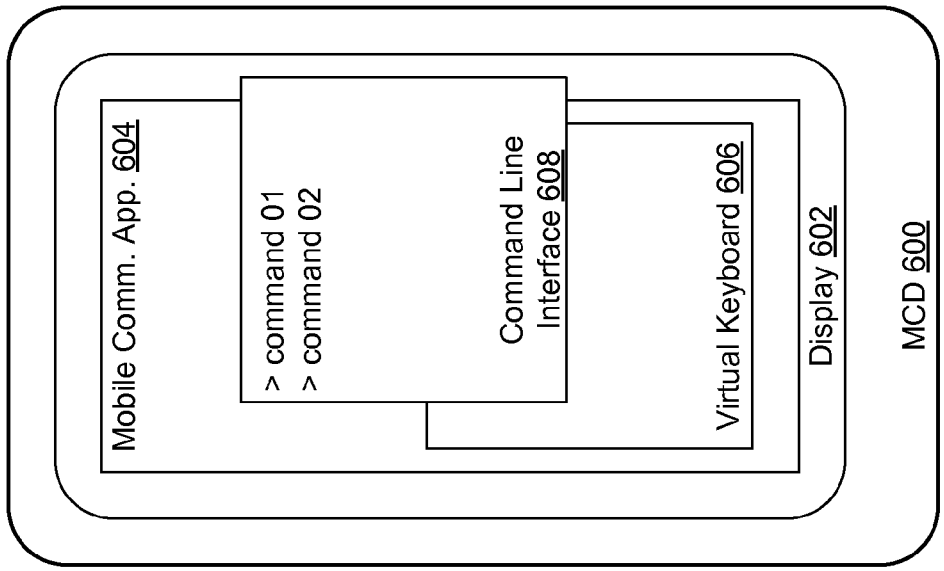
FIG. 6 illustrates a mobile communication device configured to receive commands within a mobile communications application using a command line interface.

FIG. 6 illustrates a mobile communication device 600 configured to receive commands within a mobile communications application 604 using command line interface 608. In this example, a user has entered an interrupt code while using mobile communication application 604. In response to detecting this interrupt code, mobile communication device 600 has provided the user with command line interface 608, allowing the user to enter commands. In this example, the user has entered command 01, followed by command 02. Note that in this example, the user has entered multiple commands after entering a single interrupt code.

Figure 7:
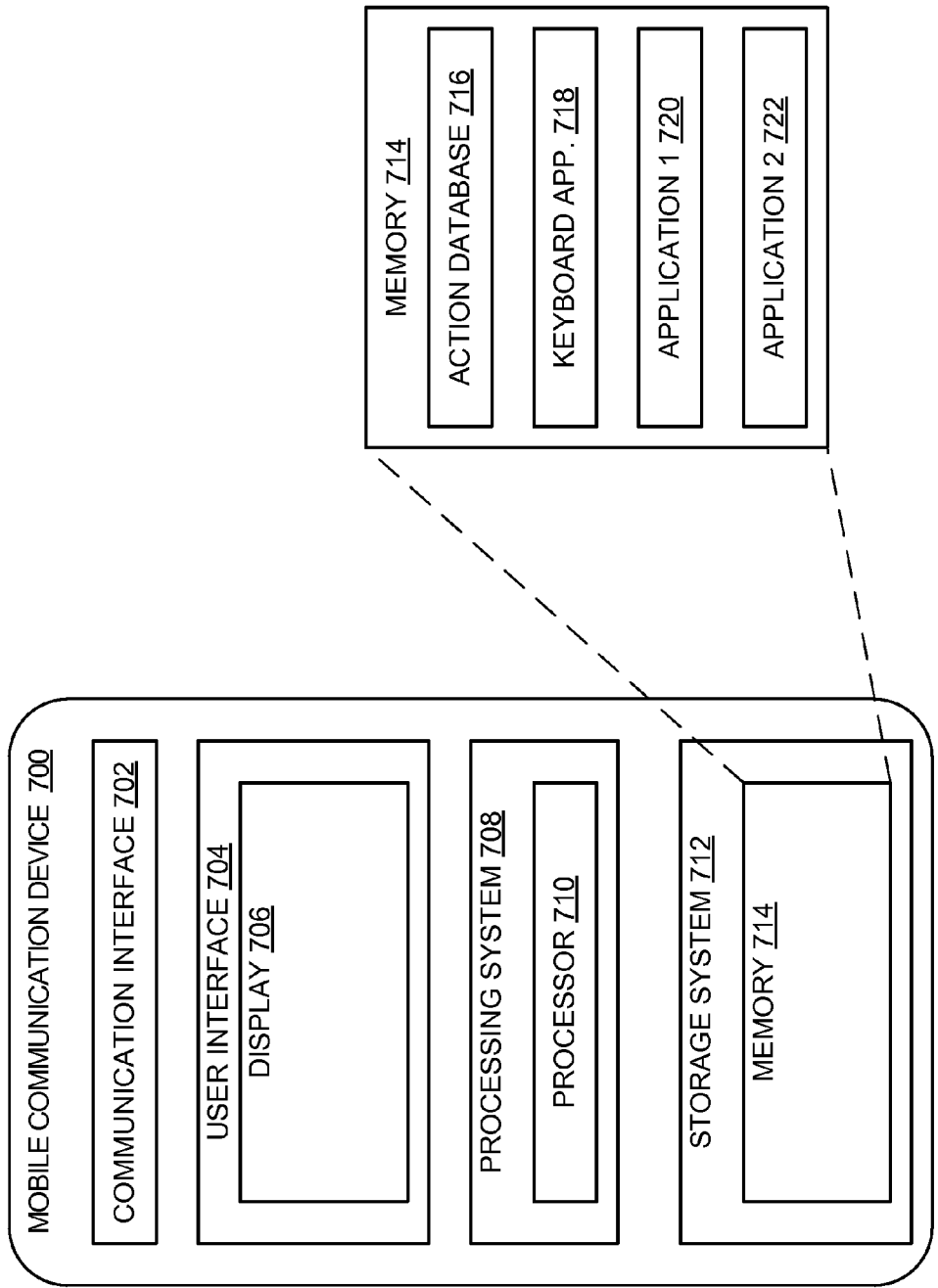
FIG. 7 illustrates a block diagram of a mobile communication device configured to receive commands within a mobile communications application.

FIG. 7 illustrates a block diagram of a mobile communication device configured to receive commands within a mobile communications application 700. The method illustrated in FIG. 2 is implemented on one or more mobile communication devices 700, as shown in FIG. 7. Mobile communication device 700 includes communication interface 702, user interface 704, processing system 708, and storage system 712. Processing system 708 is linked to communication interface 702, user interface 704, and storage system 712. Storage system 712 includes a non-transitory memory device 714 that stores various data and software.

Communication interface 702 includes components that communicate over communication links, such as network cards, ports, RF transceivers, processing circuitry and software, or some other communication devices. Communication interface 702 may be configured to communicate over metallic, wireless, or optical links. Communication interface 702 may be configured to use TDM, IP, Ethernet, optical networking, wireless protocols, communication signaling, or some other communication format—including combinations thereof.

User interface 704 includes display 706. Display 702 may be any type of display capable of presenting information to a user. Displays may include touch screens in some embodiments.

Processing system 708 includes processor 710. Processor 710 includes a microprocessor and other circuitry that retrieves and executes software from storage system 712. Storage system 712 includes a disk drive, flash drive, data storage circuitry, or some other non-transitory memory apparatus. Software within memory 714 includes computer programs, firmware, or some other form of machine-readable processing instructions. The software may include an operating system, utilities, drivers, network interfaces, applications, or some other type of software. When executed by processor 710, the software directs processor 710 to operate mobile communication device 700 according to the method illustrated in FIG. 2.

In this example embodiment, memory 714 includes action database 716 illustrated in FIG. 3, virtual keyboard application 718, application 1 720, and application 2 722. Memory 714 may also include an interrupt database as illustrated in FIG. 4. In an embodiment, application 1 720 is a mobile communication application configured to receive commands. When mobile communication device 700 detects an interrupt code within application 1 720, it then determines a command based on user inputs following the interrupt code. It then performs an action based on the command, and in this example application 2 722 is executed as the action.

In this example, mobile communication device 700 executes a number of methods stored as within storage system 712. The results of these methods are displayed to a user via display 706.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for receiving commands within a mobile communications application running on a mobile communication device, the method comprising:
    monitoring, for an interrupt code, text entered into a text input region of a touchscreen keyboard module for a messaging application within a user interface on the mobile communication device;
    detecting an interrupt code;
    in response to the detected interrupt code, determining a command from a plurality of commands, based on user inputs following the interrupt code;
    identifying an action from a plurality of actions corresponding to the plurality of commands; and
    initiating the action corresponding to the command.

2. The method of claim 1, further comprising:
    upon detection of the interrupt code, opening a command line interface within the user interface on the mobile communication device for entry of the command.

3. The method of claim 1, further comprising:
    upon detection of the interrupt code, displaying a pull-down menu of the plurality of commands associated with the interrupt code, for selection of the command by a user within the user interface on the mobile communication device.

4. The method of claim 1, further comprising:
    upon detection of the interrupt code, monitoring text entered into the text input region of the touchscreen keyboard module within the user interface on the mobile communication device for any of the plurality of commands.

5. The method of claim 1, further comprising:
    providing a customized screen within the user interface on the mobile communication device configured to allow a user to associate an action with a command.

6. The method of claim 1, wherein the action includes starting an application on the mobile communication device.

7. The method of claim 1, wherein the action includes changing a mode of communication on the mobile communication device.

8. One or more non-transitory computer readable storage media having program instructions stored thereon for receiving commands within a mobile communications application running on a mobile communication device that, when executed by a computing system, direct the computing system to at least:
    monitor, for an interrupt code, text entered into a text input region of a touchscreen keyboard module for a messaging application within a user interface on the mobile communication device;
    detect an interrupt code;
    in response to the detected interrupt code, determine a command from a plurality of commands, based on user inputs following the interrupt code;
    identify an action from a plurality of actions corresponding to the plurality of commands; and
    initiate the action corresponding to the command.

9. The one or more non-transitory computer readable storage media of claim 8, wherein the instructions further direct the computer system to:
    upon detection of the interrupt code, open a command line interface within the user interface on the mobile communication device for entry of the command.

10. The one or more non-transitory computer readable storage media of claim 8, wherein the instructions further direct the computer system to:
    upon detection of the interrupt code, display a pull-down menu of the plurality of commands associated with the interrupt code, for selection of the command by a user within the user interface on the mobile communication device.

11. The one or more non-transitory computer readable storage media of claim 8, wherein the instructions further direct the computer system to:
    upon detection of the interrupt code, monitor text entered into the text input region of the touchscreen keyboard module within the user interface on a mobile communication device for any of the plurality of commands.

12. The one or more non-transitory computer readable storage media of claim 8, wherein the instructions further direct the computer system to:
    provide a customized screen within the user interface on the mobile communication device configured to allow a user to associate an action with a command.

13. The one or more non-transitory computer readable storage media of claim 8, wherein the action includes starting an application on the mobile communication device.

14. The one or more non-transitory computer readable storage media of claim 8, wherein the action includes changing a mode of communication on the mobile communication device.

15. A mobile communication device configured for receiving commands within a mobile communications application, the device comprising:
- a memory configured to store an action database comprising a plurality of commands and a plurality of actions corresponding to the plurality of commands; and
- a processor coupled with the memory and configured to:
- monitor, for an interrupt code, text entered into a text input region of a touchscreen keyboard module for a messaging application within a user interface on the mobile communication device;
- detect an interrupt code;
- in response to the detected interrupt code, determine a command from the plurality of commands based on user inputs following the interrupt code;
- identify an action from the plurality of actions corresponding to the plurality of commands stored within the action database; and
- initiate the action corresponding to the command.

16. The mobile communication device of claim 15, wherein the processor is further configured to:
upon detection of the interrupt code, open a command line interface within the user interface on the mobile communication device for entry of the command.

17. The mobile communication device of claim 15, wherein the processor is further configured to:
upon detection of the interrupt code, display a pull-down menu of the plurality of commands associated with the interrupt code, for selection of the command by a user within the user interface on the mobile communication device.

18. The mobile communication device of claim 15, wherein the processor is further configured to:
upon detection of the interrupt code, monitor text entered into the text input region of the touchscreen keyboard module within the user interface on a mobile communication device for any of the plurality of commands.

19. The mobile communication device of claim 15, wherein the processor is further configured to:
provide a customized screen within the user interface on the mobile communication device configured to allow a user to associate an action with a command.

20. The mobile communication device of claim 15, wherein the action includes starting an application on the mobile communication device.

21. The mobile communication device of claim 15, wherein the action includes changing a mode of communication on the mobile communication device.

* * * * *